US009904251B2

(12) United States Patent
Byun et al.

(10) Patent No.: US 9,904,251 B2
(45) Date of Patent: Feb. 27, 2018

(54) HOLOGRAPHIC DISPLAY APPARATUS AND METHOD OF DRIVING THE SAME

(71) Applicant: ELECTRONICS AND TELECOMMUNICATIONS RESEARCH INSTITUTE, Daejeon (KR)

(72) Inventors: Chunwon Byun, Daejeon (KR); Jae-Eun Pi, Daejeon (KR); Yong Hae Kim, Daejeon (KR); Hakyun Lee, Seoul (KR); Chi-Sun Hwang, Daejeon (KR)

(73) Assignees: ELECTRONICS AND TELECOMMUNICATIONS RESEARCH INSTITUTE, Daejeon (KR); MVTECH, Seoul (KR)

( * ) Notice: Subject to any disclaimer, the term of this patent is extended or adjusted under 35 U.S.C. 154(b) by 152 days.

(21) Appl. No.: 14/996,527

(22) Filed: Jan. 15, 2016

(65) Prior Publication Data

US 2016/0209808 A1    Jul. 21, 2016

(30) Foreign Application Priority Data

Jan. 15, 2015  (KR) .................. 10-2015-0007467
Nov. 17, 2015  (KR) .................. 10-2015-0161211

(51) Int. Cl.
*G06F 3/038*    (2013.01)
*G03H 1/22*     (2006.01)
(Continued)

(52) U.S. Cl.
CPC ............. *G03H 1/2294* (2013.01); *G02F 1/13* (2013.01); *G03H 2001/0224* (2013.01)

(58) Field of Classification Search
CPC ... G03H 1/22; G03H 1/08; G02F 1/13; G09G 3/36; G09G 5/00; G06F 3/038
See application file for complete search history.

(56) References Cited

U.S. PATENT DOCUMENTS 6,097,362 A    8/2000  Kim
6,424,328 B1*  7/2002  Ino ...................... G09G 3/3614
                                              345/100
(Continued)

FOREIGN PATENT DOCUMENTS

KR        10-0239413 B1      10/1999
KR    10-2006-0058580 A       5/2006
(Continued)

OTHER PUBLICATIONS

"Final Program, Schedule and Session Overview" Eurodisplay 2015, Sep. 21-23, 2015, pp. 1-18, Society for Information Display, Ghent, Belgium.
(Continued)

*Primary Examiner* — Pegeman Karimi (57) ABSTRACT

A holographic display apparatus includes a light source unit, a spatial light modulator, and a spatial light modulator control circuit for controlling the spatial light modulator, the spatial light modulator control circuit including a data driving circuit for providing a data voltage to a signal line, a demultiplexer circuit which includes a plurality of switching elements connected to the signal line and sequentially turned on, and transfers the data voltage to a transfer line through a turned-on switching element among the switching elements, and a first element connected between the transfer line and a data line, passing a current flowing from the transfer line to the data line, and blocking a current flowing from the data line to the transfer line.

16 Claims, 6 Drawing Sheets

(51) Int. Cl.
*G02F 1/13* (2006.01)
*G03H 1/02* (2006.01)

(56) References Cited

U.S. PATENT DOCUMENTS

| | | |
|---|---|---|
| 7,102,600 B2* | 9/2006 | Kasai .................. G09G 3/3233 345/77 |
| 7,982,690 B2 | 7/2011 | Arai et al. |
| 8,157,389 B2 | 4/2012 | Maeda et al. |
| 8,487,859 B2 | 7/2013 | Kim et al. |
| 9,442,460 B2 | 9/2016 | Yoon et al. |
| 2004/0125067 A1* | 7/2004 | Kim .................... G09G 3/3614 345/98 |
| 2008/0158442 A1* | 7/2008 | Arai .................. G02B 26/0833 348/771 |
| 2009/0033808 A1* | 2/2009 | Maeda .................. G03B 33/06 348/756 |
| 2013/0286001 A1 | 10/2013 | Nakano et al. |
| 2014/0118508 A1* | 5/2014 | Yoon ........................ G03H 1/02 348/51 |

FOREIGN PATENT DOCUMENTS

| | | |
|---|---|---|
| KR | 10-0686312 B1 | 2/2007 |
| KR | 10-2011-0030210 A | 3/2011 |
| KR | 10-2014-0055974 A | 5/2014 |

OTHER PUBLICATIONS

Chun-Won Byun et al., "Spatial Light Modulator on Glass for High Display Quality of Digital Holography", Session 7 presented at Eurodisplay 2015, Sep. 21, 2015, pp. 1-19, ETRI (Electronics and Telecommunications Research Institute).
"LC-Based Large Area SLM Technology for Hologram Terminal", Mar. 2015, pp. 44-51.

* cited by examiner

HOLOGRAPHIC DISPLAY APPARATUS AND METHOD OF DRIVING THE SAME

CROSS-REFERENCE TO RELATED APPLICATIONS

This U.S. non-provisional patent application claims priority under 35 U.S.C. § 119 of Korean Patent Application Nos. 10-2015-0007467, filed on Jan. 15, 2015, and 10-2015-0161211, filed on Nov. 17, 2015, the entire contents of which are hereby incorporated by reference.

BACKGROUND

The present disclosure herein relates to a holographic display apparatus and a method for driving the same, and more particularly, to a holographic display apparatus with reduced switching errors and a method for driving the same.

Recently, researches on stereoscopic (three dimensional) images and image reproduction technology have been carried out. A typical two-dimensional imaging system provides a planar image, but a three-dimensional imaging system which is a type of an imaging technology presents actual image information of an object to an observer.

A spatial light modulator (SLM) for producing a hologram image may be manufactured using a silicon substrate or a glass substrate. As a required size of a hologram image is increased, a technology for manufacturing an SLM using a glass substrate is being developed. A pitch between pixels of an SLM may be reduced to obtain a hologram image with a wide viewing angle.

As the pitch between pixels are reduced to secure a viewing angle, the pitch between pixels (e.g., 5 μm) may become even smaller than a pitch between pads (e.g., 12 μm) which enables a chip on glass (COG) process in which a driver driving chip is directly attached to a substrate of an SLM. In this case, it may be difficult to perform the COG process.

In order to secure the pitch between pads which enables attachment of a driver driving chip, an SLM may be driven in a time-shared manner by integrating a switching element with the SLM. In order to reduce resistance of the switching element used for the time-shared driving, a channel width of the switching element may be increased. As the channel width of the switching element is increased, a parasitic load between a gate electrode and a source electrode of the switching element and a parasitic load between the gate electrode and a drain electrode of the switching element may increase. The parasitic loads of the switching element may cause a switching error which interrupts accurate transfer of a data voltage according to a size ratio of parasitic loads of data lines determined by a size and resolution of an SLM.

Therefore, an SLM to be manufactured on a glass substrate requires not only the switching element for the time-shared driving but also a technical solution for reducing switching errors to accurately transfer a data voltage.

SUMMARY

The present disclosure provides a holographic display apparatus having excellent display quality and a method for driving the same.

An embodiment of the inventive concept provides a holographic display apparatus including: a light source unit configured to emit light; a spatial light modulator including a pixel connected to a gate line and a data line, the spatial light modulator modulating the light emitted from the light source unit to output a hologram image; and a spatial light modulator control circuit configured to control the spatial light modulator, the spatial light modulator control circuit including: a data driving circuit configured to provide a data voltage to a signal line; a demultiplexer circuit including a plurality of switching elements connected to the signal line and sequentially turned on, the demultiplexer circuit transferring the data voltage to a transfer line through a turned-on switching element from among the plurality of switching elements; and a first element connected between the transfer line and the data line, the first element passing a current that flows from the transfer line to the data line, the first element blocking a current that flows from the data line to the transfer line.

In an embodiment, the first element may be a diode-connected transistor.

In an embodiment, the first element may include: a control terminal connected to the transfer line; a first terminal connected to the transfer line; and a second terminal connected to the data line.

In an embodiment, the first element may transfer the data voltage from the transfer line to the data line when a voltage level of the transfer line is higher than that of the data line.

In an embodiment, the first element may block the current that flows from the data line to the transfer line when a voltage level of the transfer line is lower than that of the data line.

In an embodiment, the spatial light modulator control circuit may further include a second element connected between the data line and an initializing terminal to which an initializing voltage signal is applied, the second element passing a current that flows from the data line to the initializing terminal, the second element blocking a current that flows from the initializing terminal to the data line.

In an embodiment, the second element may be a diode-connected transistor.

In an embodiment, the second element may include: a control terminal connected to the data line; a first terminal connected to the data line; and a second terminal connected to the initializing terminal.

In an embodiment, the second element may discharge charges from the data line to initialize the data line when a voltage level of the data line is higher than a level of the initializing voltage signal input to the initializing terminal.

In an embodiment, the initializing voltage signal may have an interval of a high level higher than a maximum level of the data voltage and an interval of a low level lower than a minimum level of the data voltage, and the data line may be initialized while the initializing voltage signal with the low level is input.

In an embodiment, the second element may block the current that flows from the initializing terminal to the data line while the initializing voltage signal with the high level is input.

In an embodiment, the spatial light modulator may have a reflective structure.

In an embodiment of the inventive concept, a method for driving a holographic display apparatus includes: applying a gate signal to a gate line of a spatial light modulator including the gate line and a data line, the spatial light modulator outputting a hologram image; transferring, through a switching element repeatedly turned on and off, a first data voltage to a transfer line electrically connected to the switching element while the switching element is turned on; transferring the first data voltage from the transfer line to the data line while the switching element is turned on; and blocking a current that flows from the data line to the transfer line while the switching element is turned off.

In an embodiment, the method may further include: initializing the data line charged with the first data voltage; transferring a second data voltage to the transfer line through the switching element turned on after the data line is initialized; and transferring the second data voltage from the transfer line to the data line while the switching element is turned on.

In an embodiment, a voltage level of the first data voltage may be higher than that of the second data voltage.

In an embodiment, the first data voltage may be a positive data voltage, and the second data voltage may be a negative data voltage.

In an embodiment, the initializing the data line may include initializing the data line by discharging the charges charged in the data line while the gate signal is not applied.

In an embodiment, the initializing the data line may be such performed that the data line is initialized to have a voltage lower than a minimum value of each of the first data voltage and the second data voltage.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Irrelevant parts are omitted from the drawings in order to clarify descriptions of the embodiments of the inventive concept.

Figure 1:
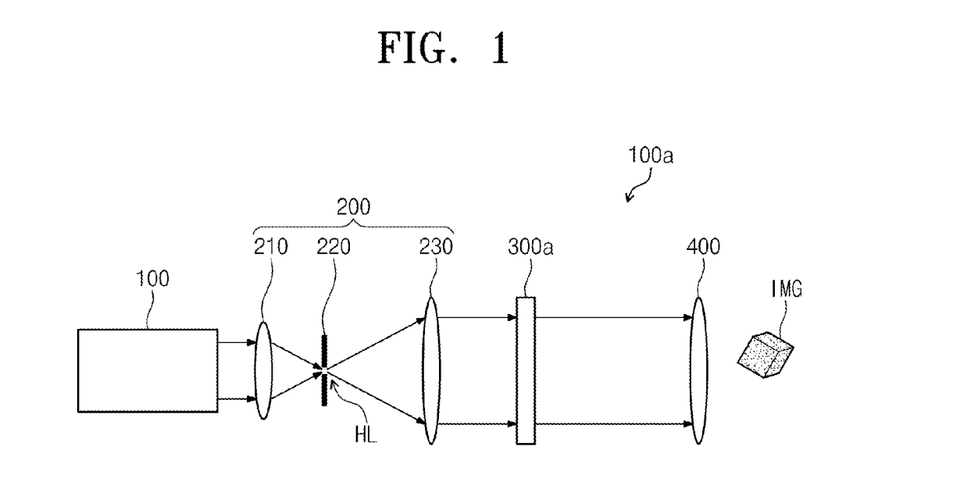
FIG. 1 is a schematic diagram illustrating a holographic display apparatus for displaying a hologram image according to an embodiment of the inventive concept.

FIG. 1 is a schematic diagram illustrating a holographic display apparatus for displaying a hologram image according to an embodiment of the inventive concept.

Referring to FIG. 1, a transmissive holographic display apparatus 100a may include a light source unit 100, a first optical system 200, a spatial light modulator 300a, and a second optical system 400.

The light source unit 100 emits light. The light source unit 100 may be a light-emitting diode (LED) light source or a laser light source for generating laser light having a coherent characteristic.

The first optical system 200 provides, to the spatial light modulator 300a, the light emitted from the light source unit 100. The first optical system 200 serves to uniformly emit the light emitted from the light source unit 100 to a front surface of the spatial light modulator 300a.

The first optical system 200 may include a focusing lens 210, a filter 220, and an extension lens 230. Light that has passed through the focusing lens 210 may pass through a pin hole HL of the filter 220. The light that has passed through the pin hole HL may increase in diameter after passing through the extension lens 230, and may be uniformly incident on the front surface of the spatial light modulator 300a. Distances among the focusing lens 210, the filter 220, and the extension lens 230 may be adjusted as appropriate.

The spatial light modulator 300a may modulate incident light to display a hologram image IMG. The spatial light modulator 300a may modulate a phase and amplitude of the incident light while transmitting the incident light, so as to display the still hologram image IMG.

The second optical system 400 focuses light that has passed through the spatial light modulator 300a on a position of a user.

Figure 2:
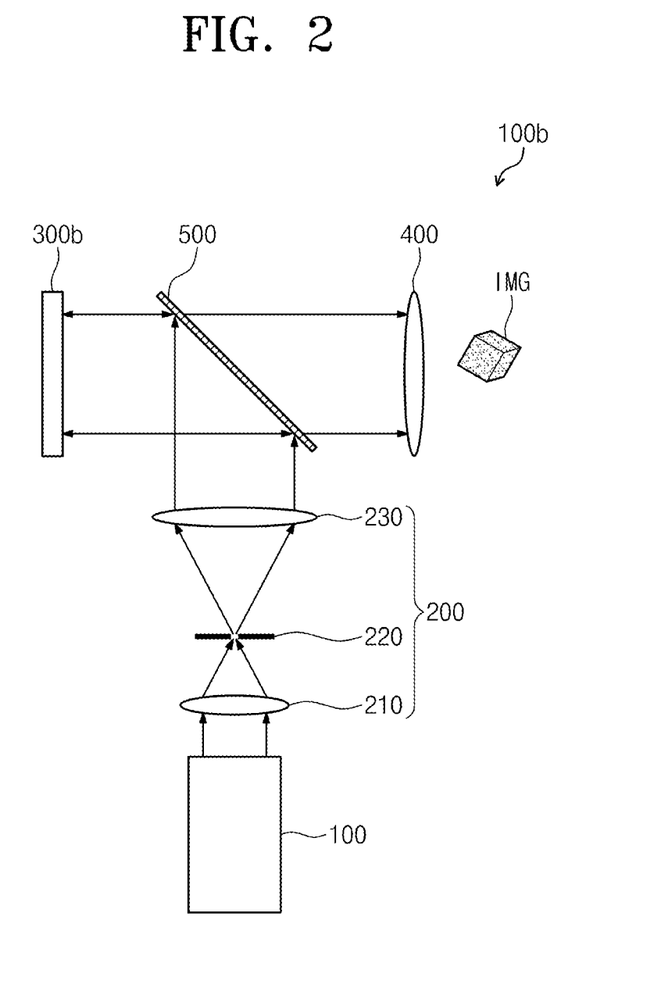
FIG. 2 is a schematic diagram illustrating a holographic display apparatus for displaying a hologram image according to an embodiment of the inventive concept.
Figure 3:
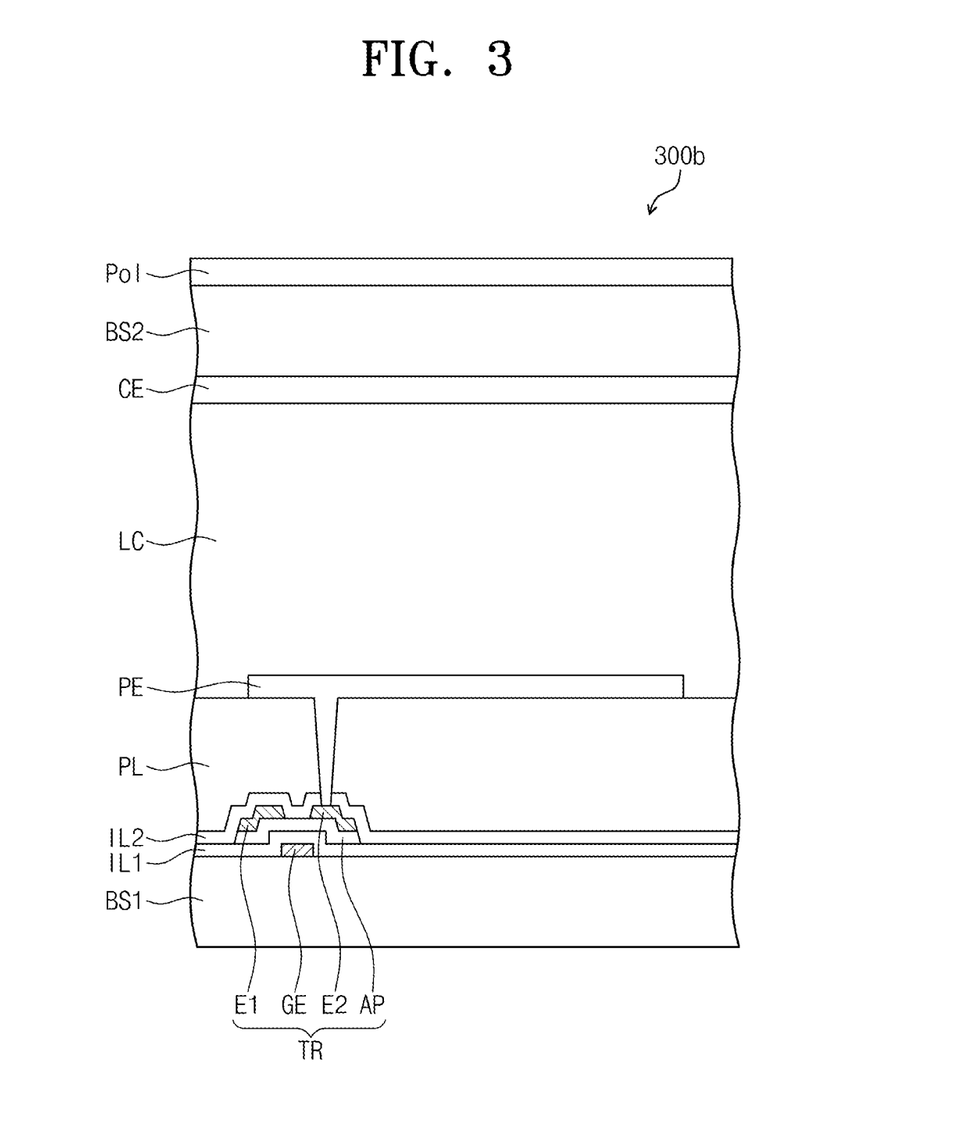
FIG. 3 is a schematic cross-sectional view of the spatial light modulator illustrated in FIG. 2.

FIG. 2 is a schematic diagram illustrating a holographic display apparatus for displaying a hologram image according to an embodiment of the inventive concept, and FIG. 3 is a schematic cross-sectional view of the spatial light modulator illustrated in FIG. 2. The holographic display apparatus of FIG. 1 includes the transmissive spatial light modulator 300a, whereas the holographic display apparatus of FIG. 2 includes a reflective spatial light modulator 300b.

Referring to FIGS. 2 and 3, a reflective holographic display apparatus 100b includes a light source unit 100, a first optical system 200, a spatial light modulator 300b, a second optical system 400, and a beam splitter 500.

The light source unit 100, the first optical system 200, the spatial light modulator 300b, and the second optical system 400 illustrated in FIG. 2 may be substantially the same as those illustrated in FIG. 1.

The beam splitter 500 may emit incident light to the spatial light modulator 300b. The beam splitter 500 induces optical coherence between light reflected from the spatial light modulator 300b and light incident from the first optical system 200, and emits resultant light to the second optical system 400.

The spatial light modulator 300b may modulate a phase and amplitude of incident light while reflecting the incident light, so as to display the hologram image IMG.

The spatial light modulator 300b may include a first base substrate BS1, a second base substrate BS2, a thin-film transistor TR, a pixel electrode PE, a liquid crystal layer LC, a common electrode CE, and a polarizer Pol.

The first base substrate BS1 and the second base substrate BS2 may be opposed to each other, and, in particular, the second base substrate BS2 may have a light transmissive property.

The thin-film transistor TR may be disposed on the first base substrate BS1. The thin-film transistor TR may include a gate electrode GE, an active pattern AP, a first electrode E1, and a second electrode E2. The active pattern AP may be disposed on the gate electrode GE with a first insulating layer IL1 therebetween. The first electrode E1 branches off from one of data lines and contacts the active pattern AP, and the second electrode E2 is spaced apart from the first electrode E1 and contacts the active pattern AP. A second insulating layer IL2 may cover the thin-film transistor TR. A planarizing layer PL may be disposed on the second insulating layer IL2.

The pixel electrode PE may be disposed on the planarizing layer PL. The pixel electrode PE may be electrically connected to the second electrode E2 via a contact hole that passes through the planarizing layer PL. The pixel electrode PE may include a light reflective material. For example, the pixel electrode PE may include a material such as aluminum (Al) or molybdenum (Mo), but is not limited thereto.

The common electrode CE may be opposed to the pixel electrode PE with the liquid crystal layer LC therebetween. The common electrode CE may include a transmissive material. For example, the common electrode CE may include an oxide such as ITO, $SnO_2$, or $ZnO_2$, but is not limited thereto.

The liquid crystal layer LC may be disposed between the pixel electrode PE and the common electrode CE. The liquid crystal layer LC may include liquid crystal molecules (not shown) arranged in a predetermined form. The pixel electrode PE and the common electrode CE may induce an electric field in the liquid crystal layer LC. The spatial light modulator 300b may adjust an arrangement state of liquid crystals by regulating a voltage provided to the pixel electrode PE. As a result, at least one of the phase or the amplitude of the light incident on the spatial light modulator 300b may be modulated according to arranged relationships among the liquid crystal molecules in the liquid crystal layer LC, and modulated light may be output.

Although FIG. 3 exemplarily illustrates that the pixel electrode PE and the common electrode CE are opposed to each other with the liquid crystal layer LC therebetween so as to induce an electric field in the liquid crystal layer LC, an embodiment of the inventive concept is not limited thereto. For example, in another embodiment of the inventive concept, the spatial light modulator 300b may induce an electric field in the liquid crystal layer LC in a lateral electric field mode. In this case, the pixel electrode PE and the common electrode CE may be arranged on the same base substrate. For example, the pixel electrode PE and the common electrode CE may be arranged on the first base substrate BS1. The pixel electrode PE and the common electrode CE may be arranged on the same plane, or may be arranged on different planes spaced apart from each other by a predetermined distance in a cross section of the spatial light modulator 300b. In this case, when voltages are applied to the pixel electrode PE and the common electrode CE, a lateral electric field is induced between the pixel electrode PE and the common electrode CE, and the liquid crystal molecules of the liquid crystal layer LC are operated by the lateral electric field.

The polarizer Pol may be disposed on the second base substrate BS2. The polarizer Pol may adjust polarization of incident light and output light. However, the polarizer Pol is merely exemplarily illustrated, and may be omitted in some cases.

FIGS. 1 and 2 are diagrams for generally describing the transmissive holographic display apparatus 100a and the reflective holographic display apparatus 100b. The spatial light modulator (310 of FIG. 4) described below is applicable not only to the transmissive holographic display apparatus 100a or the reflective holographic display apparatus 100b of FIG. 1 or 2 but also to other various holographic display apparatuses.

Figure 4:
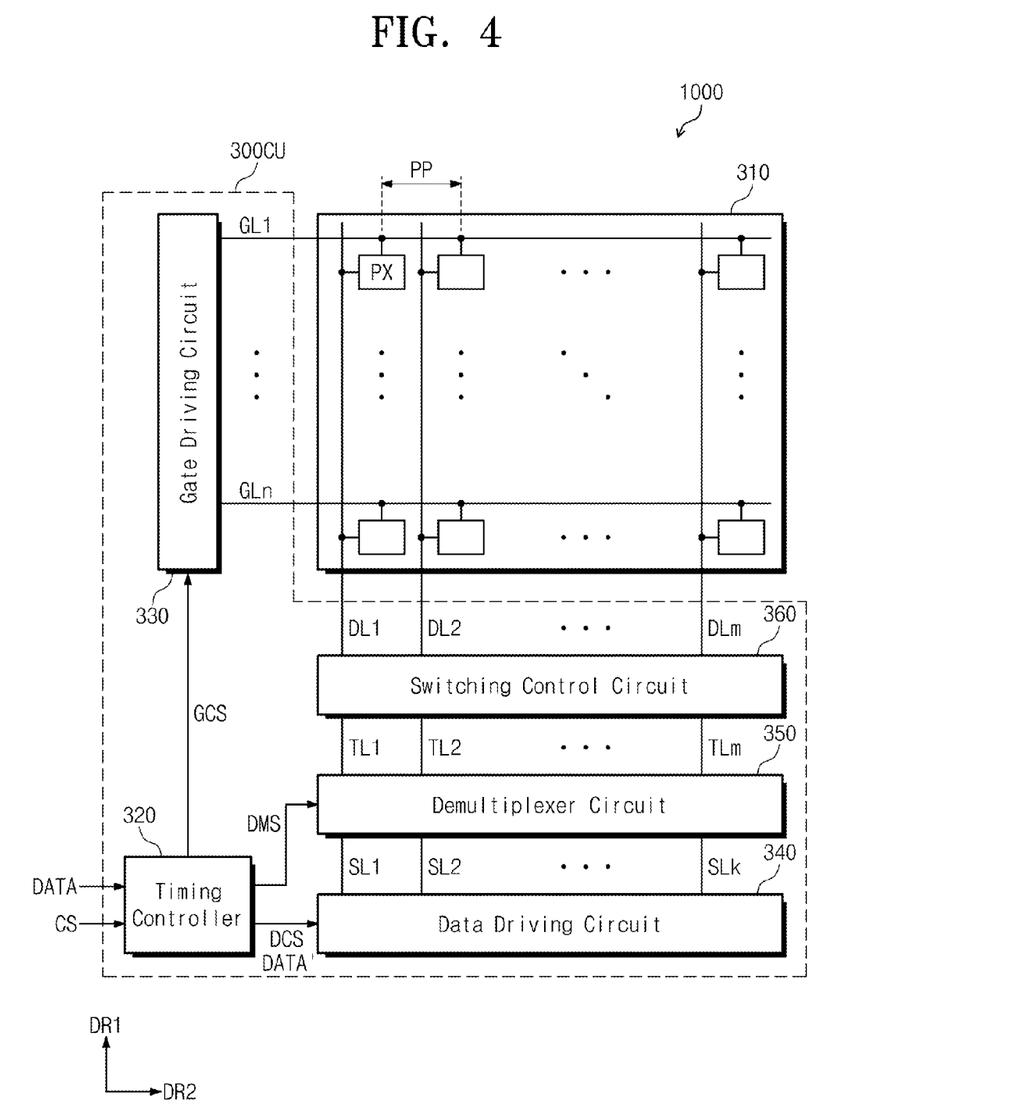
FIG. 4 is a block diagram illustrating a holographic display apparatus according to an embodiment of the inventive concept.
Figure 5:
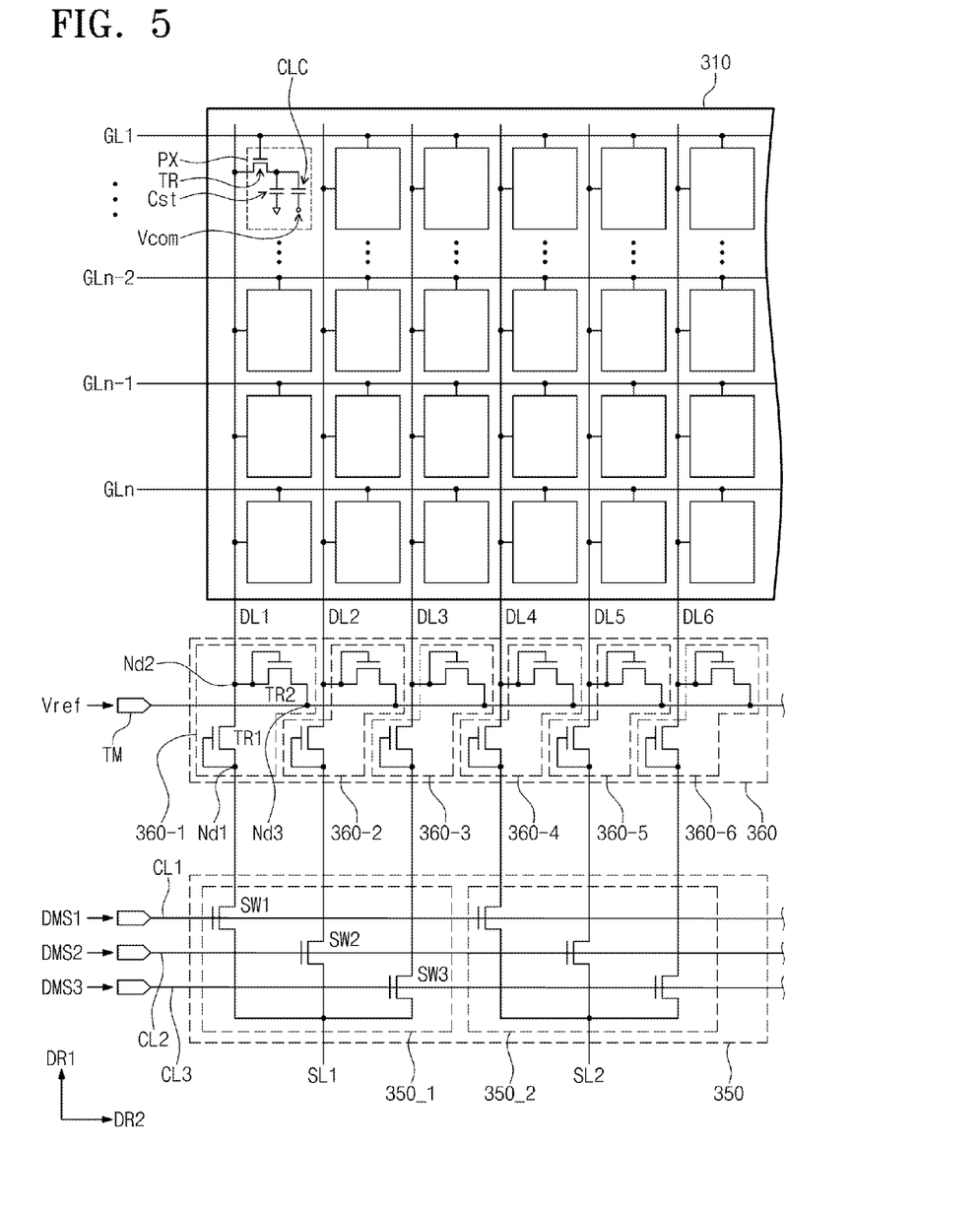
FIG. 5 is a schematic diagram illustrating the demultiplexer circuit, the switching control circuit, and the spatial light modulator illustrated in FIG. 4.

FIG. 4 is a block diagram illustrating a holographic display apparatus according to an embodiment of the inventive concept, and FIG. 5 is a schematic diagram illustrating the demultiplexer circuit, the switching control circuit, and the spatial light modulator illustrated in FIG. 4.

Referring to FIGS. 4 and 5, a hologram display apparatus 1000 may include a spatial light modulator 310 and a spatial light modulator control circuit 300CU. The spatial light modulator 310 may be the reflective spatial light modulator 300b described above with reference to FIGS. 2 and 3, but is not limited thereto.

The spatial light modulator 310 may include a plurality of data lines DL1 to DLm, a plurality of gate lines GL1 to GLn, and a plurality of pixels PX.

Each of the data lines DL1 to DLm may extend in a first direction DR1, and each of the gate lines GL1 to GLn may extend in a second direction DR2 crossing the first direction DR1. The data lines DL1 to DLm and the gate lines GL1 to GLn may define pixel regions, each of which may be provided with a pixel PX for displaying an image. FIG. 4 exemplarily illustrates the pixel PX connected to the first data line DL1 and the first gate line GL1.

The pixel PX may include a thin-film transistor TR connected to the gate lines GL1 to GLn, a liquid crystal capacitor CLC connected to the thin-film transistor TR, and a storage capacitor Cst connected in parallel to the liquid crystal capacitor CLC. The storage capacitor Cst may be omitted as necessary.

A control electrode of the thin-film transistor TR may be connected to the first gate line GL1, a first electrode of the thin-film transistor TR may be connected to the first data line DL1, and a second electrode of the thin-film transistor TR may be connected to the liquid crystal capacitor CLC and the storage capacitor Cst. A first electrode of the liquid crystal capacitor CLC is connected to the second electrode of the thin-film transistor TR, and a second electrode of the liquid crystal capacitor CLC receives a common voltage Vcom.

The spatial light modulator control circuit 300CU may include a timing controller 320, a gate driving circuit 330, a data driving circuit 340, a demultiplexer circuit 350, and a switching control circuit 360.

The timing controller 320 receives a plurality of control signals CS and a data signal DATA from the outside of the hologram display apparatus 1000. The timing controller 320 may convert the data signal DATA so that the data signal DATA is compatible with a specification of the data driving circuit 340, and may output a converted data signal DATA' to the data driving circuit 340.

The timing controller 320 generates a gate control signal GCS, a data control signal DCS, and a demultiplexer signal DMS in response to the control signals CS provided from the outside.

The gate control signal GCS is a control signal for controlling an operation timing of the gate driving circuit 330. The timing controller 320 may output the gate control signal GCS to the gate driving circuit 330. The data control signal DCS is a control signal for controlling an operation timing of the data driving circuit 340. The timing controller 320 may output the data control signal DCS to the data driving circuit 340. The demultiplexer signal DMS is a control signal for controlling an operation timing of the demultiplexer circuit 350. The timing controller 320 may output the demultiplexer signal DMS to the demultiplexer circuit 350.

The gate driving circuit 330 outputs gate signals in response to the gate control signal GCS. The gate lines GL1 to GLn receive the gate signals from the gate driving circuit 330. The gate signals are provided to the pixels PX of the spatial light modulator 310 through the gate lines GL1 to GLn.

The data driving circuit 340 generates a data voltage. In detail, the data driving circuit 340 converts the converted data signal DATA' into data voltages and outputs the data voltages in response to the data control signal DCS.

Signal lines SL1 to SLk extend in the first direction DR1 and are connected to the data driving circuit 340 and the demultiplexer circuit 350, where k is an integer larger than 0 and smaller than m. The signal lines SL1 to SLk receive the data voltages from the data driving circuit 340. The data voltages are provided to the demultiplexer circuit 350 through the signal lines SL1 to SLk.

The demultiplexer circuit 350 is disposed between the spatial light modulator 310 and the data driving circuit 340. The demultiplexer circuit 350 selectively connects the signal lines SL1 to SLk to transfer lines TL1 to TLm in response to first to third demultiplexer signals DMS1 to DMS3. The data voltages are provided to the pixels PX of the spatial light modulator 310 through the transfer lines TL1 to TLm connected to the signal lines SL1 to SLk.

At least two transfer lines (e.g., TL1 and TL2) may be connected to one signal line (e.g., SL1). In the present embodiment, three transfer lines (e.g., TL1 to TL3) are connected to one signal line (e.g., SL1). As the number of transfer lines (e.g., TL1 to TL3) connected to one signal line (e.g., SL1) increases, a distance between pads of a data driving chip (not shown) increases so that an attaching process may be performed more easily.

The demultiplexer circuit 350 may include a plurality of demultiplexers 350_1 to 350_k connected to groups of transfer lines TL1 to TLm corresponding to the signal lines SL1 to SLk. The number of the demultiplexers 350_1 to 350_k may correspond to the number of the signal lines SL1 to SLk.

Each of the demultiplexers 350_1 to 350_k may include a first switching element SW1 connected to a first control line CL1, a second switching element SW2 connected to a second control line CL2, and a third switching element SW3 connected to a third control line CL3.

The first switching element SW1 is switched in response to the first demultiplexer signal DMS1 received through the first control line CL1. The second switching element SW2 is switched in response to the second demultiplexer signal DMS2 received through the second control line CL2. The third switching element SW3 is switched in response to the third demultiplexer signal DMS3 received through the third control line CL3.

In the present embodiment, exemplarily, three of the transfer lines TL1 to TLm form one group, and the three transfer lines are connected to one demultiplexer. In detail, the first to third transfer lines TL1 to TL3 may be electrically connected to one demultiplexer 350_1. Therefore, the first signal line SL1 may be electrically connected to any one of the first to third transfer lines TL1 to TL3 to transfer a data voltage. In another embodiment of the inventive concept, one demultiplexer may be connected to at least two transfer lines. For example, in the case where one demultiplexer is connected to six transfer lines, one demultiplexer may include six switching elements.

In order to reduce resistance of each of the first to third switching elements SW1 to SW3 used for time-shared driving, a channel width thereof may be increased. As the channel width is increased, a parasitic load between a gate electrode and a source electrode of each switching element and a parasitic load between the gate electrode and a drain electrode of each switching element may increase. In this case, the parasitic loads of the first to third switching elements SW1 to SW3 may cause a switching error which interrupts accurate transfer of a data voltage according to a size ratio of parasitic loads of the data lines DL1 to DLm determined by a size and resolution of the spatial light modulator 310. For example, a data voltage charged in the pixel PX may be changed by the parasitic loads of the first to third switching elements SW1 to SW3. A rate of change in the data voltage charged in the pixel PX may be proportional to a ratio between the size of the parasitic loads of the first to third switching elements SW1 and SW3 and the size of the parasitic load of each data line. However, according to the inventive concept, the switching error may be minimized by the switching control circuit 360. More detailed description related thereto is proved below.

The switching control circuit 360 may be disposed between the demultiplexer circuit 350 and the spatial light modulator 310. The switching control circuit 360 may include a plurality of switching controllers 360_1 to 360_m respectively connected to the data lines DL1 to DLm. The number of the switching controllers 360_1 to 360_m may correspond to the number of the data lines DL1 to DLm.

The switching controllers 360_1 to 360_m may be connected between the transfer lines TL1 to TLm and the data lines DL1 to DLm, and may control a current flow between the transfer lines TL1 to TLm and the data lines DL1 to DLm.

Each of the switching controllers 360_1 to 360_m may include a first element TR1 and a second element TR2. The first switching controller 360_1 is exemplarily described in detail below, but the other switching controllers 360_2 to 360_m may have substantially the same configuration as that of the first switching controller 360_1.

A node between the first element TR1 and the first switching element SW1 is referred to as a first node Nd1, a node between the first element TR1 and the second element TR2 is referred to as a second node Nd2, and a node between the second element TR2 and an initializing terminal TM for supplying an initializing voltage signal Vref to the second TR2 is referred to as a third node Nd3.

Each of the first and second elements TR1 and TR2 may be a diode-connected transistor of which a control terminal and one other terminal are connected to the same node.

For example, the first element TR1 may include a control terminal connected to the first node Nd1, a first terminal connected to the first node Nd1, and a second terminal connected to the second node Nd2.

When the first switching element SW1 is turned on, a data voltage is applied to the first node Nd1 through the first signal line SL1. Here, a voltage level of the first node Nd1 may be higher than that of the second node Nd2, and a forward voltage may be applied to the first element TR1. The first element TR1 to which the forward voltage is applied may pass a current that flows from the first node Nd1 to the second node Nd2.

When the first switching element SW1 is turned off, the voltage level of the first node Nd1 is lower than that of the second node Nd2. As a result, a reverse voltage may be applied to the first element TR1. The first element TR1 to which the reverse voltage is applied may block a current that flows from the second node Nd2 to the first node Nd1. That is, the first element TR1 may serve as a diode.

When the first switching element SW1 is turned off, since the first element TR1 blocks the current that flows from the second node Nd2 to the first node Nd1, a change in a data voltage due to the parasitic load of the first switching element SW1 may be reduced. Therefore, a switching error due to the first element TR1 may be reduced.

In detail, in the case of the spatial light modulator 310 having a size of five inches or less, the parasitic load of each of the data lines DL1 to DLm may be smaller than that of each of the data lines DL1 to DLm of the spatial light modulator 310 having a size of at least 10 inches. Therefore, a rate of size change of a total parasitic load due to the parasitic load of the switching elements SW1 to SW3 may increase as the spatial light modulator 310 is decreased in size. That is, as the spatial light modulator 310 is decreased in size, a data voltage distortion due to the parasitic load of each of the switching elements SW1 to SW3 may become more serious. However, according to an embodiment of the inventive concept, when the switching elements SW1 to SW3 are turned off, the first element TR1 blocks the current that flows from the second node Nd2 to the first node Nd1. Therefore, the data voltage distortion due to the parasitic loads of the switching elements SW1 to SW3 may be reduced.

The spatial light modulator 310 may be driven in a line-inversion mode in which polarities of the data voltages applied to the pixels PX are inverted in circuits of at least one gate line. However, an embodiment of the inventive concept is not limited thereto, and the spatial light modulator 310 may be driven in a frame-inversion mode in which the polarities of the data voltages applied to the pixels PX are inverted in circuits of at least one frame. Furthermore, in another embodiment of the inventive concept, the spatial light modulator 310 may be driven in a dot-inversion mode in which adjacent pixels have different polarities. Such inversion-driving methods may reduce deterioration of liquid crystals of the spatial light modulator 310.

The second element TR2 may include a control terminal connected to the second node Nd2, a first terminal connected to the second node Nd2, and a second terminal connected to a third node Nd3. The second terminal TR2 may operate so as to enable inversion driving for inverting the polarities of the data voltages applied to the pixels PX. More detailed description is provided below.

It is assumed that the common voltage Vcom is 5 V, and the data voltage has a value between 0 V and 10 V. When the data voltage has a value between 5 V and 10 V, a positive data voltage may be provided to the pixel PX, and, when the data voltage has a value between 0 V and 5 V, a negative data voltage may be provided to the pixel PX.

When the negative data voltage is provided after the positive data voltage is provided, a voltage on the second node Nd2 may be higher than a voltage on the first node Nd1 so that a current flow may be blocked by the first element TR1. However, according to an embodiment of the inventive concept, the voltage of the second node Nd2 may be initialized by the second element TR2. That is, the second node Nd2 may be initialized so as to have a lower voltage level than a next data voltage before the next data voltage is provided, so that the data voltage may be easily transferred from the first node Nd1 to the second node Nd2.

In detail, a level of the initializing voltage signal Vref provided to the initializing terminal TM may be changed before the negative data voltage is provided. The level of the initializing voltage signal Vref may be lower than the level of the data voltage on the second node Nd2 and the level of the next data voltage applied to the second node Nd1. Here, a forward voltage is applied to the second element TR2. A current may flow from the second node Nd2 to the third node Nd3 through the second element TR2 to which the forward voltage is applied, and charges may be discharged from the second node Nd2 to initialize the second node Nd2. For example, the voltage level of the second node Nd2 may decrease below the negative data voltage. That is, even though the negative data voltage is provided, the voltage level of the first node Nd1 may be higher than that of the second node Nd2. Therefore, the first element TR1 may allow a current to flow from the first node Nd1 to the second node Nd2, and the pixel PX may be charged with the negative data voltage.

Furthermore, even in the case where the spatial light modulator 310 is not driven in the line-inversion mode, the second element TR2 may periodically initialize a data line. In detail, after a positive voltage of 8 V is applied to one data line, a positive voltage of 6 V may be applied to the same data line. If the data line is not initialized before the data voltage of 6 V is applied to the first node Nd1, a reverse voltage is applied to the first element TR1 since the second node Nd2 is in a state of being charged with the data voltage of 8 V. Therefore, a current flow between the first node Nd1 and the second node Nd2 may be blocked by the first element TR1. However, according to an embodiment of the inventive concept, before the data voltage of 6 V is applied to the first node Nd1, the data line is initialized using the second element TR2. As a result, a forward voltage may be applied to the first element TR1, and the first element TR1 may transfer, to the second node Nd2, the data voltage applied to the first node Nd1.

Figure 6:
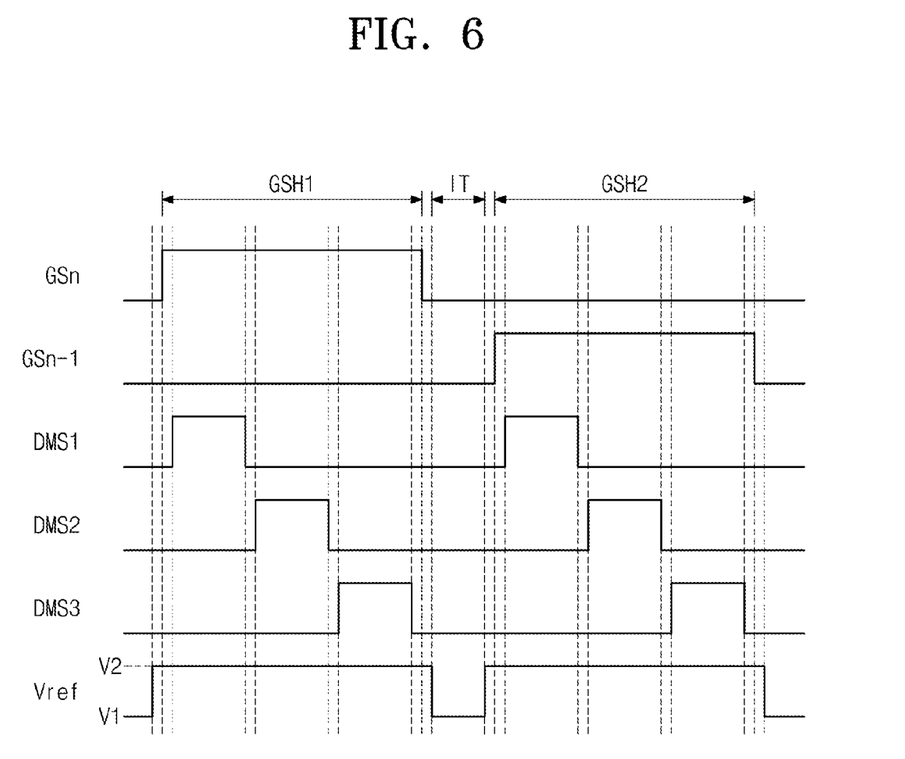
FIG. 6 is a timing diagram for describing driving of the pixels illustrated in FIG. 5.

FIG. 6 is a signal timing diagram for describing driving of the pixels illustrated in FIG. 5.

Referring to FIGS. 5 and 6, the signal timing diagram shows signal timing of an nth gate signal GSn, an (n−1)th gate signal GSn−1, the first to third demultiplexer signals DMS1 to DMS3, and the initializing voltage signal Vref applied in a part of one frame.

The nth gate signal GSn may be applied to the nth gate line GLn, and the (n−1)th gate signal GSn−1 may be applied to the (n−1)th gate line GLn−1. An interval in which the nth gate signal GSn has a high level is referred to as a first gate high interval GSH1, and an interval in which the (n−1)th gate signal GSn−1 has a high level is referred to as a second gate high interval GSH2.

In each of the first gate high interval GSH1 and the second gate high interval GSH2, the first to third demultiplexer signals DMS1 to DMS3 may have a high level sequentially.

The second demultiplexer signal DMS2 and the third demultiplexer signal DMS3 may have a low level when the first demultiplexer signal DMS1 has a high level, the first demultiplexer signal DMS1 and the third demultiplexer signal DMS3 may have a low level when the second demultiplexer signal DMS2 has a high level, and the first demultiplexer signal DMS 1 and the second demultiplexer signal DMS2 may have a low level when the third demultiplexer signal DMS3 has a high level.

The initializing voltage signal Vref may have a low level V1 and a high level V2. The low level V1 may be lower than a minimum level of a data voltage, and the high level V2 may be higher than a maximum level of the data voltage. For example, in the case where the data voltage ranges from 0 V to 10 V, the high level V2 of the initializing voltage signal Vref may be higher than 10 V, and the low level V1 of the initializing voltage signal Vref may be lower than 0 V.

During the first gate high interval GSH1 and the second gate high interval GSH2, the initializing voltage signal Vref with the high level V2 may be applied to the initializing terminal TM. In this case, even if the data voltage with the maximum level is applied to the second node Nd2, a reverse voltage may be applied to the second element TR2. Therefore, during the first gate high interval GSH1 and the second gate high interval GSH2, the second element TR2 may block a current flow between the second node Nd2 and the third node Nd3.

During a blank interval IT, the initializing voltage signal Vref with the low level V1 may be applied to the initializing terminal TM. In this case, even if the data voltage with the minimum level is charged in the second node Nd2, a forward voltage may be applied to the second element TR2. Therefore, during the blank interval IT, the second element TR2 may allow a current to flow from the second node Nd2 to the third node Nd3. Here, charges charged in the second node Nd2 may move to the third node Nd3. That is, the charges charged in the second node Nd2 may be discharged through the third node Nd3. As a result, the voltage level of the second node Nd2 may be reduced so that a voltage of a data line may be initialized. Therefore, even if a negative data voltage or a data voltage lower than a previously applied data voltage is applied to the first node Nd1 thereafter, a forward voltage may be applied to the first element TR1.

According to an embodiment of the inventive concept, the first element TR1 may block a current that flows from the second node Nd2 to the first node Nd1 when the switching elements SW1 to SW3 are turned off. Therefore, changes in data voltages charged in the data lines DL1 to DL3 due to the parasitic loads of the switching elements SW1 to SW3 may be reduced, and thus the data voltage distortion due to the parasitic loads of the switching elements SW1 to SW3 may be reduced. Furthermore, the second terminal TR2 may operate so as to enable the inversion driving for inverting the polarity of a data voltage. Therefore, the deterioration of liquid crystals may be prevented.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A holographic display apparatus comprising:
   a light source unit configured to emit light;
   a spatial light modulator comprising a pixel connected to a gate line and a data line, the spatial light modulator modulating the light emitted from the light source unit to output a hologram image; and
   a spatial light modulator control circuit configured to control the spatial light modulator, the spatial light modulator control circuit comprising:
   a data driving circuit configured to provide a data voltage to a signal line;
   a demultiplexer circuit comprising a plurality of switching elements connected to the signal line and sequentially turned on, the demultiplexer circuit transferring the data voltage to a transfer line through a turned-on switching element from among the plurality of switching elements; and
   a first element connected between the transfer line and the data line, the first element passing a current that flows from the transfer line to the data line when a voltage level of the transfer line is higher than that of the data line, the first element blocking a current that flows from the data line to the transfer line when a voltage level of the transfer line is lower than that of the data line.

2. The holographic display apparatus of claim 1, wherein the first element is a diode-connected transistor.

3. The holographic display apparatus of claim 2, wherein the first element comprises:
   a control terminal connected to the transfer line;
   a first terminal connected to the transfer line; and
   a second terminal connected to the data line.

4. The holographic display apparatus of claim 1, wherein the spatial light modulator control circuit further comprises a second element connected between the data line and an initializing terminal to which an initializing voltage signal is applied, the second element passing a current that flows from the data line to the initializing terminal, the second element blocking a current that flows from the initializing terminal to the data line.

5. The holographic display apparatus of claim 4, wherein the second element is a diode-connected transistor.

6. The holographic display apparatus of claim 5, wherein the second element comprises:
   a control terminal connected to the data line;
   a first terminal connected to the data line; and
   a second terminal connected to the initializing terminal.

7. The holographic display apparatus of claim 4, wherein the second element discharges charges from the data line to initialize the data line when a voltage level of the data line is higher than a level of the initializing voltage signal input to the initializing terminal.

8. The holographic display apparatus of claim 7, wherein the initializing voltage signal has an interval of a high level higher than a maximum level of the data voltage and an interval of a low level lower than a minimum level of the data voltage, and the data line is initialized while the initializing voltage signal with the low level is input.

9. The holographic display apparatus of claim 8, wherein the second element blocks the current that flows from the initializing terminal to the data line while the initializing voltage signal with the high level is input.

10. The holographic display apparatus of claim 1, wherein the spatial light modulator has a reflective structure.

11. A method for driving a holographic display apparatus, the method comprising:
    applying a gate signal to a gate line of a spatial light modulator comprising the gate line and a data line, the spatial light modulator outputting a hologram image;
    transferring, through a switching element repeatedly turned on and off, a first data voltage to a transfer line electrically connected to the switching element while the switching element is turned on;
    transferring the first data voltage from the transfer line to the data line while the switching element is turned on and a voltage level of the transfer line is higher than that of the data line; and
    blocking a current that flows from the data line to the transfer line while the switching element is turned off and a voltage level of the transfer line is lower than that of the data line.

12. The method of claim 11, further comprising:
    initializing the data line charged with the first data voltage;
    transferring a second data voltage to the transfer line through the switching element turned on after the data line is initialized; and
    transferring the second data voltage from the transfer line to the data line while the switching element is turned on.

13. The method of claim 12, wherein a voltage level of the first data voltage is higher than that of the second data voltage.

14. The method of claim 13, wherein the first data voltage is a positive data voltage, and the second data voltage is a negative data voltage.

15. The method of claim 12, wherein the initializing the data line comprises initializing the data line by discharging the charges charged in the data line while the gate signal is not applied.

16. The method of claim 15, wherein the initializing the data line is such performed that the data line is initialized to have a voltage lower than a minimum value of each of the first data voltage and the second data voltage.

\* \* \* \* \*